United States Patent [19]

Green

[11] Patent Number: 4,710,530

[45] Date of Patent: Dec. 1, 1987

[54] FLAME RETARDANT POLYPHENYLENE ETHER MOLDING COMPOSITIONS

[75] Inventor: Joseph Green, East Brunswick, N.J.

[73] Assignee: FMC Corporation, Philadelphia, Pa.

[21] Appl. No.: 858,612

[22] Filed: May 1, 1986

[51] Int. Cl.[4] .............................................. C08K 5/52
[52] U.S. Cl. .................................................. 524/142
[58] Field of Search ........................... 524/142; 525/68

[56] References Cited

U.S. PATENT DOCUMENTS

| | | | |
|---|---|---|---|
| 2,773,046 | 12/1956 | Dunn et al. | 260/30.6 |
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,537,952 | 11/1970 | Dahms | 161/259 |
| 3,549,479 | 12/1970 | Dahms | 161/191 |
| 3,549,480 | 12/1970 | Dahms | 161/191 |
| 3,557,053 | 1/1971 | Miller | 260/45.7 |
| 3,586,736 | 6/1971 | Takemura et al. | 260/874 |
| 3,639,506 | 2/1972 | Haaf | 260/874 |
| 3,660,531 | 5/1972 | Lauchlan et al. | 260/876 B |
| 3,912,792 | 10/1975 | Touval | 260/863 |
| 3,929,931 | 12/1975 | Izawa et al. | 260/874 |
| 4,021,406 | 5/1977 | Touval | 260/45.75 B |
| 4,033,927 | 7/1977 | Borman | 260/45.7 P |
| 4,107,232 | 8/1978 | Haaf et al. | 524/142 |
| 4,154,712 | 5/1979 | Lee, Jr. | 524/142 |
| 4,154,775 | 5/1979 | Axelrod | 260/874 |
| 4,287,119 | 9/1981 | Braksmayer et al. | 260/45 |
| 4,503,178 | 3/1985 | Green | 524/116 |
| 4,520,152 | 5/1985 | Axelrod | 524/120 |

*Primary Examiner*—John Kight
*Assistant Examiner*—Kriellion S. Morgan
*Attorney, Agent, or Firm*—Robert L. Andersen; Richard E. Elden

[57] ABSTRACT

Polybromotriphenyl phosphates provide excellent flame retardancy for styrene modified polyphenylene ether molding resins, and provide flame retardant composition thereof which exhibit desirable processing characteristics, excellent impact strength, high heat distortion temperature, and minimal tendency toward stress cracking.

7 Claims, No Drawings

FLAME RETARDANT POLYPHENYLENE ETHER MOLDING COMPOSITIONS

The present invention relates to flame retardant thermoplastic molding compositions. More particularly the invention relates to flame retardant thermoplastic molding compositions comprising a polyphenylene ether resin and a polybromotriphenyl phosphate.

Polyphenylene ethers are well-known linear thermoplastic engineering resins, the description and preparation of which are documented at length in the technical and patent literature; see U.S. Pat. Nos. 3,306,874 and 3,306,875 to Hay and U.S. Pat. Nos. 3,257,357 and 3,257,358 to Stamatoff, disclosing polyphenylene ethers blended with other polymers such as a polystyrene and U.S. Pat. Nos. 3,586,736; 3,929,931; 3,660,531 and others in which a phenylene ether is graft-copolymerized with styrene to provide modified polyphenylene ether resins. An important commercial grade polyphenylene ether engineering plastic is a blend of about 35 to 85% by weight polyphenylene ether and about 65 to 15% by weight of a polystyrene resin. Such styrene modified polyphenylene ether resins, with which the present invention is particularly concerned, are used in structural components of electrical/electronic equipment and appliances, such as computer and typewriter housings, television cabinets, and the like. Such uses require resins which are flame resistant, have high impact resistance, do not undergo stress cracking, have a high heat distortion temperature and are easily molded.

Styrene modified polyphenylene ether resins will burn if subjected to flame. To reduce their combustibility, such resins are formulated with a flame retardant additive, a large number of which have been described. One flame retardant commercially employed for these resins is an isopropylated triphenyl phosphate commercially available from FMC Corporation under the trademark Kronitex®. Triaryl phosphates have also been blended with other flame retardant components, for example with aromatic halogen compounds as disclosed in U.S. Pat. No. 3,639,506. A preferred composition in accordance with the teaching of that patent comprises from 20 to 80% by weight of poly(2,6-dimethyl-1,4-phenylene) ether, 80 to 20% by weight of high impact polystyrene (styrene modified with rubber) and from 3 to 25 parts by weight per 100 parts by weight of the polyphenylene ether composition of a flame retardant combination of 1 part triphenyl phosphate and 3 to 4 parts of a heavily chlorinated biphenyl. U.S. Pat. No. 4,154,775 states that cyclic phosphates are effective, non-plasticizing flame retardant additives for polyphenylene ether resins. Numerous other organic phosphates, phosphonates, and phosphine oxides have been proposed and tested as flame retardants for polyphenylene ether resins.

Polybromotriphenyl phosphates and their use as flame retardants in such applications as films, fibers, textiles, and certain other resins, but not modified polyphenylene oxide resins, are also reported in technical and patent literature. For example, U.S. Pat. No. 4,033,927, discloses using brominated aryl phosphates as flame retardants for polyesters, and U.S. Pat. No. 2,773,046, discloses vinyl resins (PVC) plasticized with a polyhalophenyl phosphate. Additionally, U.S. Pat. Nos. 3,537,952, 3,549,479, and 3,549,480 similarly disclose the use of a broad genus of polyhalogenated triphenyl phosphates as flame retardants in phenolic resole thermoset resins used for laminates. U.S. Pat. Nos. 3,912,792 and 4,021,406 on the other hand disclose that flame retardancy is improved when a tris(halophenyl) phosphate containing at least 3 halogen atoms per phenyl group is used in synthetic organic polymers in combination with antimony trioxide.

Conventional flame retardants, such as aryl phosphates and blends thereof with other flame retardants such as halogenated hydrocarbon compounds, with or without synergists such as antimony compounds, have generally provided satisfactory flame retardancy in modified polyphenylene ether resins, but only by sacrificing one or more desirable properties, for example, reducing processability, reducing resistance to stress cracking, reducing thermal stability, heat distortion temperature, and/or impact resistance.

The present invention provides polyphenylene ether compositions wherein the amount of flame retardant needed to obtain a UL-94 flame retardancy rating of V-0 is in general substantially below that required for conventional tris-alkylphenyl phosphates such as Kronitex ® 50 triaryl phosphate, without the addition of antimony or other synergists. Surprisingly, it has been found that these compositions exhibit minimal tendency to undergo stress cracking upon molding, have excellent impact resistance, and have substantially improved processability and heat distortion temperatures when compared with resins flame retarded with conventional triaryl phosphates.

These and other advantages are realized in thermoplastic molding compositions comprising (a) a normally flammable composition comprising a polyphenylene ether resin and a styrene resin and (b) a flame retardant amount of a polybromotriphenyl phosphate of the formula

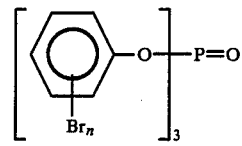

wherein n is a whole number having a value of 0 to 5, representing the number of bromine atoms on each phenyl ring, and the ratio of bromine atoms to phosphorus atoms (Br/P) is three to ten. The preferred compounds are substituted with bromine at the 4 (para) position, at the 2 and 4 (ortho and para) positions, or at the 2, 4, and 6 positions of the phenyl ring.

Thus the present invention may employ a flame retardant amount of a tris(monobromophenyl) phosphate; tris(dibromophenyl) phosphate; tris(tribromophenyl) phosphate; phenyl bis(dibromophenyl) phosphate; phenyl bis(tribromophenyl) phosphate; phenyl bis(pentabromophenyl) phosphate; diphenyl tribromophenyl phosphate; diphenyl pentabromophenyl phosphate; or a combination thereof.

The styrene modified polyphenylene ethers which are flame retarded by these polybrominated triphenyl phosphates and their preparation are well known to those skilled in the art, as indicated above. The preferred polyphenylene ether compositions are those containing from about 35 to about 65 parts by weight of polyphenylene ether and about 65 to about 35 parts by weight rubber-modified high impact polystyrene.

The polybromotriphenyl phosphate flame retardants according to the invention may be prepared by methods well known to those skilled in the art. The following examples illustrate these methods.

EXAMPLE I

Tris(2,4-dibromophenyl) phosphate

Into a two liter 4-necked flask, equipped with a nitrogen sparging tube, air stirrer, thermometer, addition funnel and a condenser fitted with a nitrogen outlet, was placed 1011 grams (4.01 mol) of 2,4-dibromophenol and 18.0 grams $AlCl_3$ (1.8% based on the phenol). The solid mixture was heated to 60° C. to melt dibromophenol and 208 grams (1.36 mol) of $POCl_3$ was added during 1.5 hours while the pot temperature increased to 85° C. Foaming occurred at this point and HCl was given off at a rapid rate. The acid was neutralized in an aqueous NaOH trap. Heating was continued and maintained at 97°-100° C. for 1.0 hours, at 112°-117° C. for 4.5 hours. GLC analysis showed a small amount of phenolic components still present. An additional 4.5 g (0.029 mol) of $POCl_3$ was added and the mixture was heated at 122°-137° C. for another 2.0 hours. While in the molten state, the pot mixture was poured into a beaker and the solidified product was triturated with methanol. The methanol removed 54.0 grams of soluble material. The remaining solids were dissolved in hot toluene and insoluble aluminum salts were filtered off. The filtrate was then washed twice with 100 ml of 2% NaOH, once with water. The toluene solution, upon concentration yielded a total of 629 g (60% yield) of crude phosphate m.p. 95°-100° C.

The crude phosphate (486 g) was purified by recrystallization from toluene to give 440 g of colorless crystalline solids, m.p. 103°-106° C.

Analysis for $C_{18}H_9Br_6O_4P$: Calcd.: C 27.03; H 1.13; Br 60.00. Found: C 27.08; H 1.37; Br 60.06.

EXAMPLE II

Phenyl bis(2,4-dibromophenyl) phosphate

A solution containing 2,4-dibromophenol (distilled), 278 g (1.10 mol), triethylamine, 115 g (1.14 mol) and $CH_2Cl_2$, 350 ml was reacted with phenyl dichlorophosphate, 115.8 g (0.55 mol) at 10°-15° C. (3 hrs.) and then at 20°-23° C. (1.0 hr.). After the separation of the amine hydrochloride salt, the $CH_2Cl_2$ solution was washed with 100 ml of each of the followings, $H_2O$, 2% aqueous NaOH, saturated NaCl solution and $H_2O$. The washed $CH_2Cl_2$ solution was concentrated and the solid product after being washed with methanol was dissolved in 200 ml toluene. The toluene solution was then washed with 1% HCl solution to remove a trace amount of amine. Excess toluene was removed and the oily residue solidified to a waxy mass which was collected as the mixed ester.

Analysis for $C_{18}H_{11}Br_4O_4P$: Calcd.: C 33.66; H 1.73; Br 49.82. Found: C 33.69; H 1.56; Br 49.77.

EXAMPLE III

Tris(4-bromophenyl) phosphate

In a 500 ml 3-neck flask equipped with air stirrer, nitrogen sparging tube, thermometer, condenser with nitrogen outlet, was placed 4-bromophenol (m.p. 65° C.), 100 g (0.578 mol), $POCl_3$, 30 g (0.196 mol) and $AlCl_3$, 5.0 g (5% based on the weight of 4-bromophenol). With stirring and within 45 minutes the mixture was heated to 70° C. The generation of HCl was first observed when the pot temperature reached 40° C. and was at steady rate at 70° C. for 30 minutes and then subsided. Heating was continued at 100° C. for a total of five hours. To work up, the mixture was cooled to 50° C. and 150 ml of methanol was added. The white precipitate was filtered and dissolved in a mixed solvent containing 400 ml acetone and 100 ml toluene. A small amount of insoluble solids (aluminum salts) was removed by filtration and the filtrate was reduced to 100 ml. Upon the addition of 50 ml methanol to the filtrate, colorless crystalline solids separated which were collected as the triester. It melted at 117°-110° C. with a clear melt.

EXAMPLE IV

Diphenyl 2,4,6-tribromophenyl phosphate

In a 3 liter 3-neck flask, 2,4,6-tribromophenol, 400 g (1.21 mol), methylene chloride (dried over molecular sieves over night), 600 ml and triethylamine (dried over KOH), 123 g (1.21 mol) were placed. The amine should be added with part of the 600 ml $CH_2Cl_2$ and added slowly through an additional funnel to avoid localized heat of mixing. Under a slight heating, about 50 ml of $CH_2Cl_2$ was distilled off to remove a trace amount of water. Upon cooling the solution to 10° C., diphenyl chlorophosphate, 324.9 g (1.21 mol) was added under nitrogen atmosphere during two hours. The pot temperature was maintained at 15°-20° C. during this period. After the addition of the dichlorophosphate, the bath was removed and the mixture allowed to warm up to room termperature and mixed for an additional hour. The mixture was filtered to remove triethylamine hydrochloride salt and the filtrate was washed once with 150 ml of 1N HCl solution and then with water until the wash was neutral. The $CH_2Cl_2$ solution was dried with anhydrous $MgSO_4$, filtered and placed under vacuum to remove $CH_2Cl_2$. The brownish oily residue (618 g., 91% yield) was collected as the product.

EXAMPLE V

Tris (2,4,6-tribromophenyl) phosphate 2,4,6-Tribromophenol, 330.8 g (1.0 mol), was heated to 92° C. to melt. A partial vacuum was applied in an attempt to remove any trace of moisture. Pot temperature was slightly reduced and after the addition of $AlCl_3$ (6.7 gm) $POCl_3$, 52.0 g (0.34 mol) was added during one half hour. Heating was continued at 88°-90° C. for two hours. During this period dissolution, and foaming took place. Temperature was gradually increased to 130° C. during three hours and maintained for six hours. Then during the course of four hours, the temperature was increased further to 220° C. and kept for two hours. At the end of reaction, the pot mixture was cooled down to 150° C. and 300 ml of toluene was added. Insoluble salts were filtered off and the filtrate was mixed with methanol to precipitate out the product. Filtered to collect the off-white solid product (71.0 g, 23% yield) which melted 220°-225° C. After recrystallization from toluene, 62.0 g of white powder, m.p. 223°-226° C., was collected and characterized as the triester. The mass spectroscopic analysis showed the presence of molecular ions and isotope distribution patterns in accord with the triester molecular formula.

Analysis for $C_{18}H_6Br_9O_4P$: Calcd.: C 20.86; H 0.58; Br 69.39. Found: C 20.78; H 0.44; Br 69.31.

Test Procedures

Sample Preparation

To compound resin and additives for the tests described below, a dry blend of the powdered resin and liquid or solid additive was prepared. The dry blend was then fed into the twin screw extruder at a preselected temperature. The resin and additives were melt compounded inside the extruder where the temperature and mixing screw plasticate and mix the ingredients. The molten compound exited through a nozzle and immediately entered a cooling bath (water) and was then chopped to give pellets. The pellets were injection molded to evaluate processability and prepare samples for testing of flammability and other tests, using as a control an isopropylated tris(phenyl) phosphate, also known as Kronitex ® 50 flame retardant. The resin utilized in each case was Noryl ® PX844 produced by General Electric Corporation, a blend of poly(2,6-dimethyl-1,2-phenylene) ether and high impact polystyrene having a softening point of approximately 137° C.

Test for Flame Retardancy

The compositions prepared as described above were subjected to the Underwriters Laboratory vertical burn test, UL-94, in which a sample (5.0×0.5×0.0625 in.) was exposed vertically to a Bunsen burner flame for 10 seconds. The sample was ignited at the bottom and burned up. If the specimen self-extinguished within 30 seconds, another 10 second application was made. Flaming droplets were allowed to fall on dry absorbent surgical cotton located 12 inches below the sample. If the average burning time for ten samples was less than 5 seconds and the drips did not ignite the cotton, the material was rated V-0. If the time was greater than 5 seconds but less than 25 seconds and the drips did not ignite the cotton, the material was classified V-1. If the sample was self-extinguishing but the cotton was ignited, the material was classified as V-2.

The results of the flammability tests are set forth in Table 1. The data reported in the table represents the average or range of data obtained in each test. Roman numerals identify the compound by the numeral used in the preparatory examples above.

In general the compounds of Examples I through III produced UL-94 rating of V-0 when employed in an amount of 10 to 12 parts of test compound per 100 parts resin, whereas at least 15 parts of the control compound was consistently required to obtain a marginal V-0 rating. The compound of Example IV, tested only at 12 parts, obtained the same UL rating as the control at 15 parts.

Stress Cracking Test

The specimens used in the stress cracking test were injection molded bars having the dimensions 2.5×0.5×0.125 inches. The bar was placed in a stress jig to give approximately 1% strain. Liquid flame retardant to be evaluated was brushed over the middle 0.5 inch of the bar. Time to first visible crack and complete failure of the bar were recorded. The test is performed at room or elevated temperature.

The results are reported in Table II. No observable stress cracking occurred for the compound of Example IV, over a period of 200 hours, whereas the control produced stress cracking in 0.25 hours.

Spiral Flow Test

Evaluation of plastic flow for processability was done using an injection molding machine and spiral flow mold. The mold consists of a cavity in the shape of a spiral in which flow or distance numbers in inches are inscribed in the cavity. Molten plastic enters the mold and fills the mold's cavity. Depending on the flow characteristic of the plastic resin, the spiral will fill up more (better flow) or less (poorer flow). The flow also depends on molding profile (injection temperatures, pressures, shot size, etc.), therefore comparison of different resin compositions were done at the same conditions. The reading of the flow was taken by removing the molded spiral and reading the number of inches of flow.

The results together with observations concerning molding characteristics are shown in Table III. In this series of tests two controls were used, Kronitex ® 50 (Control A) and a brominated polystyrene/antimony oxide mixture (Control B). The data illustrate that, while processability, the compounds of the invention do not fume or juice on molding as does the Control A. The data also illustrate that while the brominated polystyrene/antimony oxide, Control B, does not fume or juice, it exhibits very poor processability.

Impact Resistance Test

Impact resistance of compositions of the invention were measured by the notched IZOD method of ASTM test designation D-256, Method A, using samples having the dimensions 2.5×0.5×0.125 in. In this method a notched sample held as a vertical cantilever beam was broken by a single swing of a pendulum. The force required to break the sample was calculated and reported in inch-pounds.

The samples were also tested for impact resistance by the Gardner method, ASTM designation D 3029, method G incorporated herein by reference.

The results are shown in Table IV. Compounds I and III provided the same or slightly better impact resistance than Control A in both the Izod and Gardner impact tests. Compound IV at 12 parts provided somewhat less Izod impact resistance than that provided by Control A at 15 parts. All test compounds provided much better Gardner impact resistance than Control B.

Heat Distortion Test

The temperature at which deformation occurs when subjected to gradual heating was determined in accordance with ASTM designation D 648-82. Specimens having the dimensions 5×0.5×0.125 in, supported at both ends were immersed in a liquid and were subjected to 264 psi pressure on the center of the sample. Measurements of the deflection were made while gradually increasing the temperature of the liquid medium to a temperature at which the center of the sample was deflected 0.25 mm. This temperature was recorded as the deflection temperature and is reported in Table IV.

The heat distortion temperature of the test compounds pounds was in all instances substantially improved over that of Control A.

TABLE 1

| Flammability Data for Noryl PX844 | | | |
|---|---|---|---|
| Flame Retardant (Cpd of Example) | pph[a] | UL-94. Sec. | UL-94 Rating |
| I | 14 | 3.6 | V-0 |
|   | 12 | 3.9 | V-0 |

TABLE 1-continued
Flammibility Data for Noryl PX844

| Flame Retardant (Cpd of Example) | pph[a] | UL-94. Sec. | UL-94 Rating |
|---|---|---|---|
|  | 10 | 4.6 | V-0 |
| Control | 15 | 5.0 | V-0 |
| II | 14 | 5.1 | V-1 |
|  | 12 | 5.2 | V-1 |
|  | 10 | 5.0 | V-0 |
| Control | 15 | 5.0 | V-0 |
| III | 12 | 4.4 | V-0 |
| Control | 15 | 5.9 | V-1 |
| IV | 12 | 8.8 | V-1 |
| Control | 15 | 7.8 | V-1 |

[a]Parts by weight flame retardant per 100 parts by weight resin

TABLE II
Stress Cracking of Noryl ® PX844

| Flame Retardant (Cpd of Example) | Crack Time | Comment |
|---|---|---|
| I | — | Solid |
| II | — | Solid |
| III | — | Solid |
| IV | >200 hrs | — |
| Control | 0.25 hrs | — |

TABLE III
Spiral Flow and Molding Characteristics

| Flame Retardant | pph[a] | Spiral[b] Flow | Molding Characteristics[c] Fuming | Juicing |
|---|---|---|---|---|
| I | 12 | 35 | No | No |
| Control A[d] | 15 | 39.5 | Yes | Yes |
| Control B[e] | 15 | 26 | No | No |
| III | 12 | 32.5 | No | No |
| Control A | 15 | 39.5 | Yes | Yes |
| Control B | 15 | 26 | No | No |

[a]Parts by weight flame retardant per 100 parts by weight resin
[b]Inches
[c]At 500° F. molding temperature
[d]Kronitex ® 50
[e]12 pph brominated polystyrene plus 3 pph antimony oxide

TABLE IV
Impact Resistance and Heat Distortion Data

| Flame Retardant | pph[a] | Impact Resistance Izod | Impact Resistance Gardner | Deflection Temp (°F.) |
|---|---|---|---|---|
| I | 10 | 4.1 | 198 | 203 |
| Control A | 15 | 4.2 | 172 | 160 |
| Control B | 15 | 2.6 | 25 | 221 |
| III | 12 | 4.0 | 227 | 178 |
| Control A | 15 | 4.1 | 185 | 164 |
| Control B | 15 | 2.6 | 25 | 221 |
| IV | 12 | 2.1 | 145 | 176 |
| Control A | 15 | 4.2 | 177 | 145 |
| Control B | 15 | 2.6 | 25 | 221 |

[a]Parts by weight flame retardant per 100 parts by weight resin
[b]Kronitex ® 50
[c]12 pph brominated polystyrene plus 3 pph antimony oxide

I claim:

1. A flame retarded thermoplastic molding composition consisting essentially of
   (a) a normally flammable styrene modified polyphenylene ether resin
   (b) a flame retardant amount of a polybromotriphenyl phosphate of the formula $$\left[ \left\langle \begin{array}{c} \phantom{x} \\ Br_n \end{array} \right\rangle - O \right]_3 P = O$$

wherein n is a whole number having a value of 0 to 5 inclusive, representing the number of bromine atoms on each phenyl ring, and the ratio of bromine atoms to phosphorus atoms is 3 to 10.

2. The composition of claim 1 wherein the flame retardant is selected from tris(2,4-dibromophenyl) phosphate; phenyl bis(2,4-dibromophenyl) phosphate; and tris(4-bromophenyl) phosphate.

3. The composition of claim 2 wherein from 8 to about 15 parts by weight of the flame retardant is employed per 100 parts of the modified polyphenylene ether resin.

4. The composition of claim 2 in which the flame retardant is tris(2,4-dibromophenyl) phosphate.

5. A method for retarding the flammability of modified polyphenylene ether molding compositions comprising incorporating into a normally flammable molding composition consisting essentially of a styrene modified polyphenylene ether resin a flame retardant amount of a compound consisting essentially of a polybromotriphenyl phosphate of the formula $$\left[ \left\langle \begin{array}{c} \phantom{x} \\ Br_n \end{array} \right\rangle - O \right]_3 P = O$$

in which n is a whole number having a value of 0 to 5, representing the number of bromine atoms on each phenyl ring, and the ratio of bromine to phosphorus atoms is 3 to 10.

6. The method of claim 5 wherein said polybromotriphenyl phosphate is selected from tris(2,4-dibromophenyl) phosphate, phenyl bis(2,4-dibromophenyl) phosphate, and tris(4-bromophenyl) phosphate.

7. The method of claim 6 wherein from 8 to about 15 parts by weight of tris(2,4-dibromophenyl) phosphate is employed per 100 parts by weight of a styrene modified polyphenylene resin consisting essentially of from 35 to about 65 parts by weight polyphenylene ether and from 65 to 35 parts by weight high impact styrene.

* * * * *

UNITED STATES PATENT AND TRADEMARK OFFICE
CERTIFICATE OF CORRECTION

PATENT NO. : 4,710,530

DATED : December 1, 1987

INVENTOR(S) : Joseph Green

It is certified that error appears in the above-identified patent and that said Letters Patent is hereby corrected as shown below:

Column 6, line 21, "while processability," should read --while Control A and the test compounds exhibit excellent processability,--; line 59, "compounds pounds" should read --compounds was--.

Signed and Sealed this

Tenth Day of December, 1991

Attest:

HARRY F. MANBECK, JR.

*Attesting Officer*     *Commissioner of Patents and Trademarks*